C. H. LAND, Jr.
TRAILER.
APPLICATION FILED JUNE 27, 1921.
1,409,733.
Patented Mar. 14, 1922.
2 SHEETS—SHEET 2.
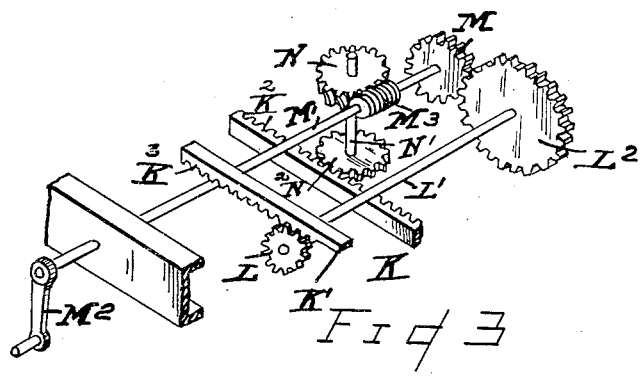
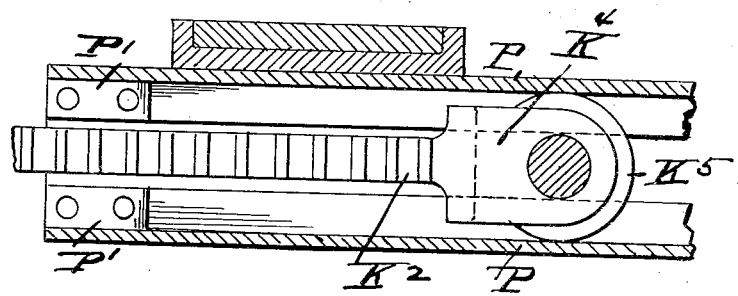
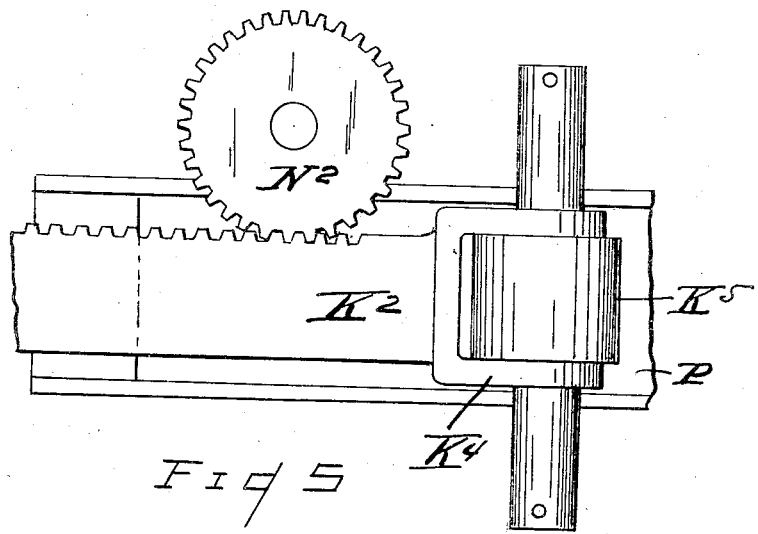
Inventor
Charles H. Land, Jr
By S. S. Thomas
Attorney

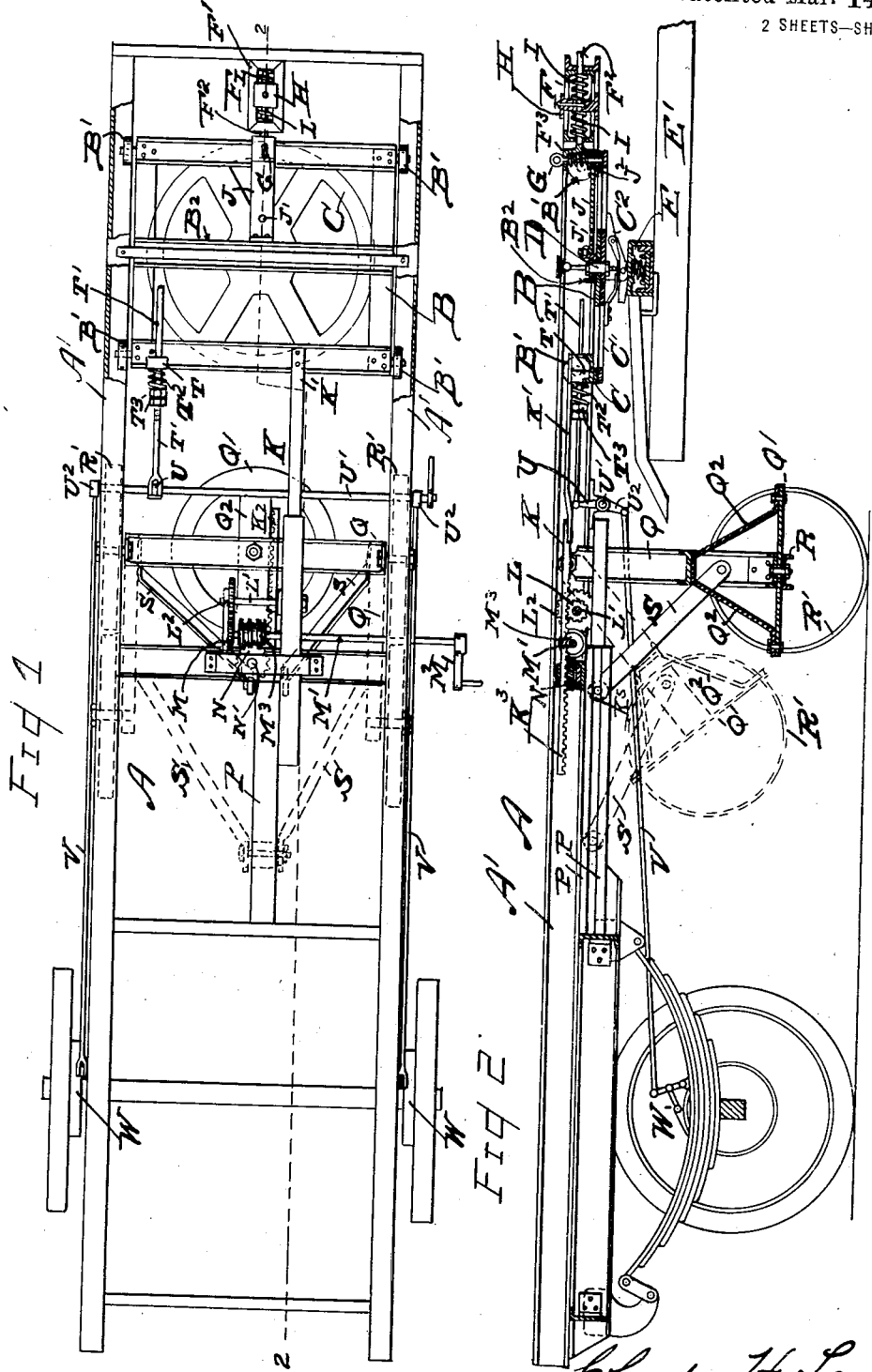

UNITED STATES PATENT OFFICE.

CHARLES H. LAND, JR., OF DETROIT, MICHIGAN, ASSIGNOR OF ONE-HALF TO WILLIAM H. WILSON, OF DETROIT, MICHIGAN.

TRAILER.

1,409,733.    Specification of Letters Patent.    Patented Mar. 14, 1922.

Application filed June 27, 1921. Serial No. 480,529.

*To all whom it may concern:*

Be it known that I, CHARLES H. LAND, Jr., a citizen of the United States, residing at Detroit, county of Wayne, State of Michigan, have invented a certain new and useful Improvement in Trailers, and declare the following to be a full, clear, and exact description of the same, such as will enable others skilled in the art to which it pertains to make and use the same, reference being had to the accompanying drawings, which form a part of this specification.

My invention relates to a trailer and particularly to the mechanism for raising and lowering the supporting leg of the trailer.

One of the objects of the present invention is to provide means acting in conjunction with a movable frame carried by the frame of the trailer, in turn connected with a supporting leg pivoted to the frame of the latter;—the construction being such that a relatively short movement of the frame will result in a relatively long movement of said first named means, whereby the supporting leg may be raised or lowered as required.

A further object of the invention is to provide a spring draw-bar adapted to relieve the movable member and its co-acting parts of the stresses due to starting, stopping and variations of the load due to road conditions when traveling.

A further object of the invention is the means provided in connection with the spring draw-bar for locking the movable frame.

A further object of the invention is an impact brake mechanism automatically actuated when the brakes of the tractor are applied in transit.

Another feature of the invention is the worm gear and train of spur gears which coordinate with a divided slidable reach connecting the movable member or frame with means coupling said reach with the swinging leg whereby the forward end of the trailer is supported when disconnected from the tractor.

Another feature of the invention is the means for adjusting the brake rod, and its extension through a supporting bracket.

With the foregoing and other objects in view which will appear as the description preceeds, the invention further resides in the combination and arrangement of parts and in the details of construction hereinafter described and claimed, it being understood that changes may be made in the precise embodiment of the invention herein disclosed without departing from the spirit of the same.

In the drawings accompanying this specification:

Figure 1 is a plan view of a trailer embodying my invention.

Figure 2 is a longitudinal vertical sectional view through the trailer taken on or about line 2—2 of Figure 1 showing a fragmentary rear end of a tractor to which the trailer is coupled.

Figure 3 is a diagrammatic detail view in perspective of the divided reach and train of gears for actuating the same,—showing a crank fitted to the shaft of one of the worm gears for manually operating the swinging leg.

Figure 4 is a fragmentary detail with parts in section showing the reach bar,—the caster supporting the end of the bar, supported between two opposing channel members, and means for limiting the movement of the bar.

Figure 5 is a plan view of the fragmentary detail shown in the preceding figure.

Referring now to the letters of reference placed upon the drawings:—

A, denotes a trailer and A' the side sills of the trailer frame. B, indicates a movable frame mounted upon wheels B' traveling in the side sills of the trailer frame—see Figure 1,—which shows a fragment of the sills broken away and in section to disclose the wheels of the movable frame. C, denotes the stationary member of a fifth wheel bolted to the movable frame and C' is the rotatable member of the fifth wheel pivoted to the stationary member by a king-bolt D. $C^2$ is a suitable coupling mechanism carried by the rotatable member adapted to co-operate with a coupling element E carried by the tractor E'. F, indicates a spring draw-bar comprising a rectangular frame F', bolted to the end sill of the trailer. $F^2$ is the draw-bar proper, slidable through the frame and sill provided with a yoke-shaped end $F^3$ having apertures to receive a spring actuated locking pin G. H, is a member pinned to the draw-bar $F^2$. I, I, are springs sleeved upon the draw-bar $F^2$ adapted to bear against the ends of the frame F' and the member H. J, is a member bolted to and extending forwardly from the central transverse channel iron $B^2$ of the movable frame,—provided with holes $J'$ and $J^2$ to receive the spring actuated locking pin G for securing the movable frame in its initial or adjusted positions. K, is a divided reach, the member $K'$ being bolted to the movable frame, its rear end being provided with rack teeth $K^3$ meshing with a pinion L, mounted on the transverse shaft $L'$ suitably journaled in the frame of the trailer. $L^2$ is a spur-gear mounted on the end of the shaft $L'$ in mesh with the pinion M upon the shaft $M'$, extending transversely to the side sills of the trailer, and fitted with a crank arm $M^2$ for manually operating the shaft when required. $M^3$ is a worm-gear mounted on the shaft $M'$, in mesh with a like gear N, keyed to the vertical shaft $N'$, also suitably journaled in the frame of the trailer. $N^2$ is a spur-gear on the shaft $N'$ in mesh with the rack teeth $K^2$, on the rear extension of the divided reach. The member $K^2$ of the reach is fitted at its end with a yoke $K^4$ in which is journaled a caster $K^5$, adapted to track between the longitudinally arranged channel members P, P. Q, is a swinging supporting leg pivoted to the frame of the trailer and fitted at its lower end with a turn-table $Q'$ braced by suitable arms $Q^2$. R, is a rotatable axle pivoted to the turn-table and $R'$ $R'$ are supporting wheels carried by the axle. S, is a link connecting the leg Q, with the spindle of the caster $K^5$. $P'$ $P'$ are stop plates bolted to the flanges of the channel members P to limit the movement of the rack-bar $K^2$ upon the yoke $K^4$ contacting therewith. T, denotes a bracket carried by the movable frame through which extends an impact brake rod $T'$. $T^2$ is a spring sleeved upon the rod between the bracket T, and nuts $T^3$ $T^3$, for adjusting the tension of the spring. The rod $T'$ has a yoke shaped end to receive a rocker arm U carried by the transverse shaft $U'$ journaled in the side sills of the trailer frame. $U^2$ $U^2$ are rocker arms at the end of the shaft $U'$ to which are connected brake rods V, V, respectively engaged with the brakes W, W, carried by the traction wheels of the trailer.

Having now indicated the several parts by reference letters the construction and operation of the device will be readily understood.

It will be assumed that the trailer is in the position shown in Figure 2 and that a tractor has been backed into coupling relation with the coupling mechanism carried by the fifth wheel of the movable frame of the trailer the coupling pin G having been released so that the frame may be moved backwardly through the movement of the tractor. The movable frame having been caused to shift its position the forward member of the divided reach bolted thereto will through the train of gears connecting it with the rearwardly extending reach member serve to raise the swinging leg to the position indicated in dotted lines in Figure 2,—the movement of the last named reach member being multiplied by the train of gears. Upon the leg being raised to the position shown in dotted lines the coupling pin G is inserted through the apertures $J^2$ in the plate J. Should the brakes of the tractor be applied while hauling the trailer the brake mechanism of the trailer will be automatically applied through the action of the impact brake rod $T'$ acting upon the transverse rock-shaft $U'$ and the brake rods V connected with the latter. The tension of the spring carried by the impact brake rod may be adjusted by the means of the nuts $T^3$.

Having thus described my invention what I claim is:—

1. In a trailer; a movable frame supported in the frame of the trailer; a swinging leg pivoted to the frame of the trailer for supporting the latter; a divided reach having one portion connected to the movable frame; means for connecting the other portion of the reach to the swinging leg, whereby the latter may be raised and lowered; and means actuated by the first named portion of the reach for multiplying the movement of the last named portion of the reach, whereby a relatively short movement of the movable frame will result in shifting the swinging leg from the limit of its movement in one direction to the limit of its movement in the opposite direction.

2. In a trailer; a movable frame supported in the frame of the trailer; a swinging leg pivoted to the frame of the trailer for supporting the latter; a reach comprising a divided rack bar, one portion of which is connected to the movable frame; links connecting the other portion of the reach with the swinging leg; and a train of gears operably connecting the divided portions of the reach, whereby a relatively short movement of the movable frame will serve to actuate the swinging leg to the limit of its movement in either direction.

3. In a trailer; a movable frame supported upon wheels tracking in the frame of the trailer; a swinging leg pivoted to the frame of the trailer for supporting the latter; a rotatable fifth wheel mechanism carried by the movable frame provided with a coupling mechanism adapted to automatically co-operate with a coupling mechanism carried by a tractor, whereby the tractor and trailer may be coupled together; a spring draw-bar between the movable frame and the frame of the trailer and means for locking the spring draw-bar upon the movable frame reaching the limit of its movement in either direction.

4. In a trailer; a movable frame supported in the frame of the trailer; a swinging leg pivoted to the frame of the trailer for supporting the latter; a divided reach having one portion connected to the movable frame; means for connecting the other portion of the reach with the swinging leg for raising and lowering the latter; and an impact brake mechanism adapted to be actuated through the sudden stoppage of the trailer due to the application of the tractor brake or other cause, whereby the trailer and tractor may be simultaneously brought under control.

5. In a trailer; a movable frame supported upon wheels tracking in the side members of the trailer frame; a swinging leg pivoted to the frame; a divided rack-bar reach having one member connected with the movable frame; a roller fitted to the other member of the divided reach tracking in a longitudinal member of the trailer frame; and a train of gears operably connecting the divided members of the reach, whereby a relatively short movement of the movable frame will serve to actuate the swinging leg to the limit of its movement in either direction.

In testimony whereof, I sign this specification in the presence of two witnesses.

CHARLES H. LAND, Jr.

Witnesses:
S. E. THOMAS,
IDA GOREN.